(12) United States Patent
Sayal et al.

(10) Patent No.: US 8,412,671 B2
(45) Date of Patent: Apr. 2, 2013

(54) SYSTEM AND METHOD FOR DEVELOPING A STAR SCHEMA

(75) Inventors: Mehmet Sayal, Mountain View, CA (US); Fabio Casati, Palo Alto, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2356 days.

(21) Appl. No.: 10/918,587

(22) Filed: Aug. 13, 2004

(65) Prior Publication Data

US 2006/0036637 A1 Feb. 16, 2006

(51) Int. Cl.
*G06F 17/30* (2006.01)

(52) U.S. Cl. ......................................................... 707/605

(58) Field of Classification Search .................... 707/100
See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,369,761 A * | 11/1994 | Conley et al. | 707/2 |
| 5,412,806 A | 5/1995 | Du et al. | |
| 5,546,571 A | 8/1996 | Shan et al. | |
| 5,694,591 A | 12/1997 | Du et al. | |
| 5,826,239 A | 10/1998 | Du et al. | |
| 5,870,545 A | 2/1999 | Davis et al. | |
| 5,937,388 A * | 8/1999 | Davis et al. | 705/8 |
| 5,956,725 A * | 9/1999 | Burroughs et al. | 707/101 |
| 6,014,673 A | 1/2000 | Davis et al. | |
| 6,041,306 A | 3/2000 | Du et al. | |
| 6,078,982 A | 6/2000 | Du et al. | |
| 6,151,608 A * | 11/2000 | Abrams | 707/100 |
| 6,161,103 A * | 12/2000 | Rauer et al. | 707/4 |
| 6,308,163 B1 | 10/2001 | Du et al. | |
| 6,363,353 B1 * | 3/2002 | Chen | 707/102 |
| 6,728,932 B1 | 4/2004 | Chundi et al. | |
| 7,076,493 B2 * | 7/2006 | Myers et al. | 707/101 |
| 7,139,779 B1 * | 11/2006 | Kornelson et al. | 707/203 |
| 7,181,450 B2 * | 2/2007 | Malloy et al. | 707/4 |
| 2002/0116389 A1 * | 8/2002 | Chen et al. | 707/103 R |
| 2002/0143780 A1 * | 10/2002 | Gorman | 707/100 |
| 2003/0171876 A1 * | 9/2003 | Markowitz et al. | 702/20 |
| 2003/0220926 A1 * | 11/2003 | Huelsman et al. | 707/100 |
| 2004/0153435 A1 * | 8/2004 | Gudbjartsson et al. | 707/1 |
| 2004/0236786 A1 * | 11/2004 | Medicke et al. | 707/104.1 |
| 2005/0010550 A1 * | 1/2005 | Potter et al. | 707/1 |
| 2005/0060340 A1 * | 3/2005 | Sommerfield et al. | 707/102 |
| 2005/0071143 A1 * | 3/2005 | Tran et al. | 703/11 |

OTHER PUBLICATIONS

IBM, "Hardware Description Language Modeling for Analog-Hardware Designs", Nov. 1990, IBM Technical Disclosure Bulletin, p. 1-5.*

Vetter, "Database Design Methodology", Dec. 1981, Prentice-Hall Intl., p. 6-20, 82-85.*

(Continued)

*Primary Examiner* — Khanh Pham (57) ABSTRACT

Disclosed embodiments of the present invention relate to a system and method for automatic generation of a star schema. The system and method may comprise categorizing a data field into one of a plurality of data field types, one of the data field types being an enumeration type data field. The system and method may further comprise developing dimensions for a table that represents an initial star schema design using the categorization of the data, detecting functional dependencies between the data field and other data fields, and refining the initial star schema design by modifying the table based on detected functional dependencies.

25 Claims, 5 Drawing Sheets

OTHER PUBLICATIONS

Courter, "Mastering Microsoft Office 2000 Professional Edition", Dec. 1999, SYBEX, p. 742-743, 753-757.*

Liu, "Design and Evaluation Rules for Building Adaptive Schema in an Object-Oriented Data and Knowledge Base System", Nov. 1994, Proceedings of the Third International Conference on Information and Knowledge Management CIKM '94, ACM Press. p. 329-336.*

Shepelev, et al., "Automatic Workflow Generation", Sep. 1996, Proceedings of the Conference on European Design Automation EURO-DAC '96/EURO-VHDL '96, IEEE Computer Society Press, p. 1-6.*

Utley, "Designing the Star Schema Database", Jun. 19, 2004, CIO Briefings.com, <<http://web.archive.org/web/20040619010439/http://www.ciobriefings.com/whitepapers/StarSchema.asp>>.*

IBM_TDB, "Software Compiler for Analyzing and Measuring Programs", Sep. 1, 1993, Acc. No. NA9309123, IBM Technical Disclosure Bulletin, vol. 36, No. 9A, p. 123-128 (repaginated).*

Muller, "Focus on Openview: A Guide to Hewlett-Packard's Network and Systems Management Platform", 1995, p. 1-306 (repaginated).*

Vassiliadis, "Modeling multidimensional databases, cube and cube operations", Jul. 1998, Proceedings of the 10th SSDBM Conference, p. 1-12.*

Logic Works, "ERwin Methods Guide", Dec. 1997, Version 3.0, p. 1-96, <Retrieved from the internet Nov. 8, 2008>.*

Sayal, "Semantic Analysis of E-Business Operations", Jun. 18, 2002, HPL Technical Report 2002-176, <Downloaded from hp.com>.*

Menzel, "Context Sensitive Mobile Devices in Architecture Engineering and Construction", Aug. 2004, ITCom, vol. 9, p. 389-407.*

Hu, "Visual Modeling of XML Constraints Based on a New Extensible Constraint Markup Language", Jan. 2004, Pace University, p. 1-119.*

Spaccapietra, "View Integration: A Step Forward in Solving Structural Conflicts", Apr. 1994, IEEE Transactions on Knowledge and Engineering, vol. 6, No. 2, p. 258-274.*

* cited by examiner

SYSTEM AND METHOD FOR DEVELOPING A STAR SCHEMA

BACKGROUND

Data aggregation relates to many different computing fields including data analysis, reporting, data mining, data integration, and so forth. A definition of data aggregation may include any process in which information is gathered, arranged, and/or expressed in summary form for purposes such as statistical analysis. In one example relating to data aggregation, the detailed activities of a business may be converted by data aggregation into a high-level view of the business, which can then be used by business managers and non-technical users for evaluation purposes. In another example, data aggregation may be utilized by a website to collect data relating to searches performed on the website. The resultant data may then provide information regarding the most frequently requested search terms submitted to the website or even information regarding frequent users of the website.

There are many purposes for data aggregation. One specific purpose of data aggregation is to acquire information about particular groups, based on specific variables, such as age, profession, or income. Such information may be used to choose content and advertising likely to appeal to an individual belonging to one or more groups for which data has been collected. Another purpose of data aggregation may be to provide a generalized view of detailed data, which can be used to facilitate all manner of business analysis and strategizing.

A star schema is one method of performing data aggregation. Specifically, star schema is a database design that may be used for modeling data warehouses to enable analytical querying of numeric data. The star schema may relate to two types of data: dimensional data, which describes how data is commonly aggregated, and fact or event data, which describes individual transactions. Accordingly, the star schema may comprise two types of database tables (e.g., facts tables and dimension tables). Facts tables contain aggregated numeric and additive values, generally referred to as measurements. Dimension tables contain values for different perspectives by which the measurements can be interpreted.

In one example relating to the star schema, a facts table may contain columns that store aggregated sales amounts of a company. Additionally, associated dimension tables may contain columns that may be used to query the sales amounts by time, location, and customer. In accordance with this example, a star schema may comprise one facts table (i.e., aggregated sales amounts) and three dimension tables (i.e., time, location, and customer). Each dimension table may contain detailed information about one dimension (e.g., city, state, and country name fields in the location table). Additionally, the facts table presented in this example may contain three foreign key columns (one for each dimension table's primary key), and one or more columns for storing numeric measurements (e.g., the sales amount). A primary key may be an attribute or group of attributes that uniquely identifies a tuple (i.e., a set of attribute values pertaining to a given item in a database) within a database or table. For example, a client table might have a client number as its primary key. A foreign key, on the other hand, may be a table field that is not a key in its current table, but is a primary key in another database table The design of a star schema may require knowledge of data relationships and underlying semantics, which may be obtained by analysis of the data. Accordingly, the star schema design may be resource intensive. In fact, some tasks related to determining a star schema may utilize manual analysis or human input to explain data semantics and relationships. It may be difficult to determine which data fields can be placed into the facts or dimension tables and to determine whether there exist any hierarchical or functional relationships among the fields that are chosen for dimension tables. Additionally, even aspects that do not utilize human input may require specific tools and applications that assume the existence of semantic and relational knowledge about the data.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
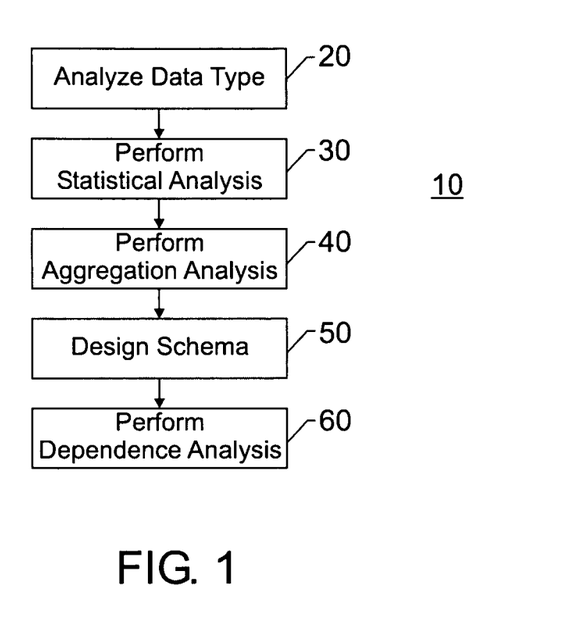
FIG. 1 is a diagram of a method for automatically generating a star schema from any given data by determining suitable data fields for aggregation and by determining how to aggregate those data fields in accordance with embodiments of the present invention.

FIG. 1 is a diagram of a method for automatically generating a star schema from any given data by determining suitable data fields for aggregation and by determining how to aggregate those data fields in accordance with embodiments of the present invention. The diagram may be generally referenced by the reference numeral 10. Some embodiments of the present invention may automatically analyze any type of data or data structure (e.g., textual, numeric, date, and so forth) to allow for summarization. Input to the method may include any kind of data source consisting of one or more data fields. The input may be structured (e.g., database tables) or semi-structured (e.g., delimited text file or XML document). The results or output of embodiments of the present invention may be a star schema design based on a set of simple rules that describe what data fields can be aggregated and how to aggregate them. In one embodiment of the present invention, the method may comprise feeding results into an existing data aggregation tool.

The automatic analysis illustrated in FIG. 1 may make manual processing of data and human input unnecessary in accordance with embodiments of the present invention. Because manual processing and human input generally require significant amounts of time, automatic analysis may result in more rapid data aggregation, star schema design, and star schema deployment. Moreover, embodiments of the present invention may be applied to a wide variety of data or data structures. This aspect may allow for a broad range of uses for the illustrated method and for related embodiments. Based on such generic and automatic analysis, a star schema may be automatically designed for a wide variety of types and structures of given data in accordance with embodiments of the present invention. Further, such embodiments may result in increased speed of design and deployment of star schema. For example, in one embodiment of the present invention, separate analysis of each data field increases design and deployment speed.

The diagram 10 in FIG. 1 comprises five blocks relating to automatic determination of a complete star schema without any prior knowledge of data semantics and relationships in accordance with embodiments of the present invention. Block 20 represents determining what data fields are appropriate for aggregation and for being included in the star schema. For example, block 20 may represent analyzing the type and distribution (e.g., relative quantities) of values in each data field of a data source and categorizing them into numeric, text, or date/time type data fields. Numeric may refer to numeric data fields such as integers or floating point numbers. Text may refer to textual data fields that contain alphabetic characters, numbers, and other symbols. Date/time may refer to data fields containing date and/or time (e.g., time of day) values.

Block 30 may represent statistical analysis in accordance with embodiments of the present invention. Such statistical analysis may vary depending on the field types determined in block 20. For numeric type data, the statistical analysis may count the number of unique data values and the number of occurrences of each unique data value in a numeric data field. Similarly, for text type data, the number of unique data values and the number of occurrences in a textual data field may be counted. For date/time type data, the date and time values may be analyzed to determine what granularity levels (e.g., year, day, hour, minute, and so forth) are available (e.g., only date, only time, or both). A set of sub-fields may be assigned to each date/time field depending on the granularity determination. For example, Year, Month, DayOfMonth, and DayOfWeek sub-fields can be assigned to a date/time field that includes the related granularities but that does not include an actual time granularity in its data values (i.e., hours, minutes, seconds, and so forth cannot be distinguished in the data values). If additional information is provided, such as the notion of an academic calendar year, or business calendar units (e.g., financial quarter or financial year), such additional information may also be used as sub-fields. The output of block 30 may include data distributions (e.g., relative quantities of data values in a data field) and counts for all data fields relating to the data source. For example, the output may include data distributions and counts for numeric and text type data fields. Similarly, the output of block 30 may include data distributions and counts for sub-field lists relating to date/time data fields.

Block 40 may represent performing an aggregation analysis to produce aggregation rules. Specifically, the statistics collected in block 30 may be utilized in block 40 to determine which data fields are suitable for aggregation and then aggregation rules may be provided for such data fields. For example, numeric data fields can be aggregated using various functions (e.g., sum, count, minimum, maximum, average, and so forth) and any of these various functions may be assigned to numeric data fields as aggregation rules. Block 40 may also represent the introduction of a new field type referred to as enumeration. Enumeration data fields, in contrast to numeric data fields, may only be suitable for counting a number of occurrences of each unique data value within a data field. Accordingly, in one embodiment of the present invention, only the count function may be assigned as an aggregation rule for enumeration data fields. Numeric and text data fields may be reassigned to this new field type if they are capable of categorization into a reasonable number of classes based on the distribution of their data values. A reasonable number of classes may correspond to a user defined or algorithmically-defined threshold. For example, a user may define a percentage of a number of values (e.g., 80% or 90%) or a relative number (e.g., if the total number of values is in the millions, a reasonable number of classes may be in the thousands). Similarly, an algorithm may designate certain percentages based on a particular system's data distribution. However, if a system contains an extremely high number of values, a high limit range may be set.

Block 40 may include further statistical analysis to make certain text data fields useable for categorization. Some text data fields may not initially be capable of proper categorization (i.e., cannot be labeled as enumeration data fields) because such data fields often contain items or records with unique data values. For example, the "Explanations" field in a purchase order database, which may have been provided for textual explanations about the purchase order, may contain a unique value (e.g., street names, dates, various features of products, and so forth) for each purchase order record. Embodiments of the present invention may extract such common features (e.g., street names, dates, various features of products, and so forth) from these data fields to make the data fields useable for categorization. In one embodiment of the present invention, this type of feature extraction may be accomplished by counting the number of occurrences of individual terms (e.g., keywords or groups of keywords), measuring distribution of terms over the collected data records, and selecting the terms that have been observed more than a predefined number or percentage of times within the given data records. The selected terms may be defined as features and used for categorization as described below.

In some embodiments of the present invention, enumeration data fields may be identified using a two-step analysis. First, the number of unique data values in each data field may be compared with the total number of data items in that field. If the number of unique data values is significantly smaller than the total number of data items (but larger than one), the data field may be categorized as enumeration. Second, the distribution of data field values may be examined to determine whether the data field values are distributed over at least a few unique data values. If a particular data field's values are distributed over at least a few unique data values, that data field may be suitable for labeling as an enumeration data field. In other words, if the data distribution is not extremely skewed (i.e., most data items have the same data value), the data field is labeled as an enumeration data field in accordance with embodiments of the present invention. It should be noted that, if all data values are the same in a data field, attempting to categorize data based on that data field is useless. For example, if a database of inquiries contains a "yes" answer for every inquiry, it would be useless to categorize the inquiries based on the "yes" answer because it would be a mere reproduction of the data base.

Block 50 represents creation of an initial schema design in accordance with embodiments of the present invention. Specifically, creation of the initial schema design, as represented by block 50, may include separating facts and dimension table fields from one another. In some embodiments of the present invention, all of the enumeration data fields designated in block 40 are assigned to dimension tables and all of the numeric data fields are assigned to facts tables. If the original data source (e.g., database tables, XML documents, or character delimited files) imposed any groupings among the enumeration data fields, such groupings may be preserved. Alternatively, enumeration data fields may be assigned to a single dimension table.

Block 60 represents refining the initial schema design created in block 50. Specifically, the refinement illustrated by block 60 may comprise splitting the dimension table(s) established in block 50 into smaller dimension tables in accordance with extracted functional dependencies. A functional dependency is a particular relationship between two attributes. For example, a data field B is functionally dependent on a data field A if an only if for each value of A, no more than one value of B is associated. In other words, the value of data field A uniquely determines the value of B. Accordingly, if several records or tuples (i.e., a set of values of attributes pertaining to a given item in a database) have the same value of A, then all such tuples or records will have an identical value of attribute B.

Embodiments of the present invention may use functional dependence to identify relationships among the data fields of dimension table(s), and to find out dimensional hierarchies among the data fields, if such hierarchies exist. In some embodiments of the present invention, the dimensional data fields that have functional dependencies may be placed into the same dimension table, while the data fields that do not have functional dependencies may be separated into different dimension tables. Additionally, if primary keys have not already been provided or identified by an existing database schema, the functional dependencies may be used for identifying the primary keys of dimension tables. If a primary key does not exist in a dimension table, a new data field may be added to each such table. Further, a unique data value may be assigned to each occurrence of this new data field to uniquely identify each table entry. After functional dependencies have been found, the dimension tables have been split according to the functional dependencies, and any primary keys of the dimension tables have been identified, the dimension tables may be linked to the facts table by adding each one of the primary keys of the dimension tables into the facts table as a foreign key.

Figure 2:
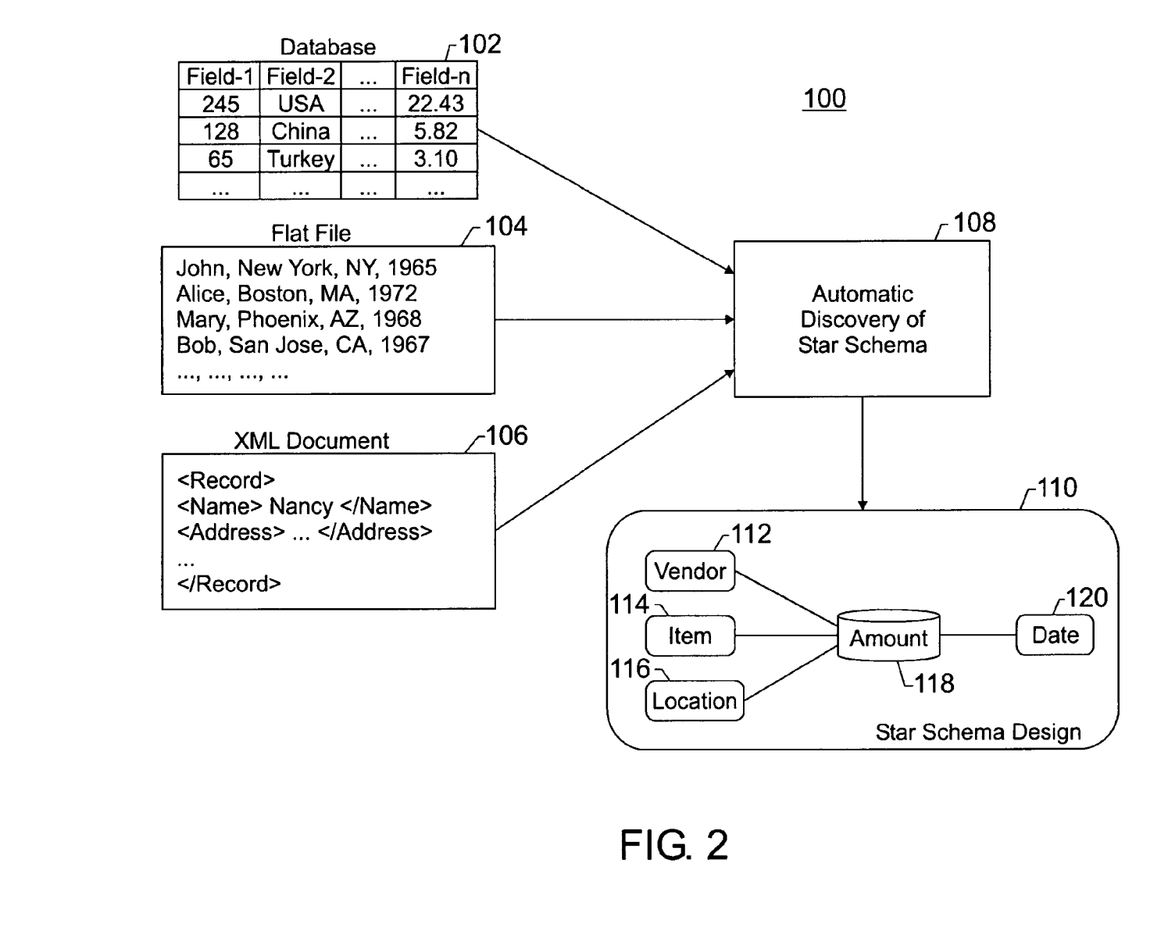
FIG. 2 is a block diagram illustrating inputs and outputs of a system and method for automatically determining star schema in accordance with embodiments of the present invention.

FIG. 2 is a block diagram illustrating inputs and outputs of a system and method for automatically determining a star schema in accordance with embodiments of the present invention. The input and output diagram may be generally referenced by the reference numeral 100. Blocks 102, 104, and 106 represent three different types of inputs in accordance with embodiments of the present invention. Block 102 represents a database table and illustrates exemplary values that may exist within the database table. Block 104 represents a flat file and illustrates exemplary values that may exist within the flat file. Block 106 represents an XML Document and illustrates exemplary values that may exist within the XML document. Block 108 represents a system and method in accordance with embodiments of the present invention. For example, block 108 may represent the method illustrated in FIG. 1. The output of block 108 is represented by block 110, which represents a star schema design in accordance with embodiments of the present invention. Additionally, blocks 112, 114, 116, 118, and 120 within block 110 illustrate an exemplary star schema. Blocks 112, 114, 116, and 120 represent different dimensions (i.e., vendor, item, location, and date) and block 118 represents a facts table (i.e., amount).

Figure 3:
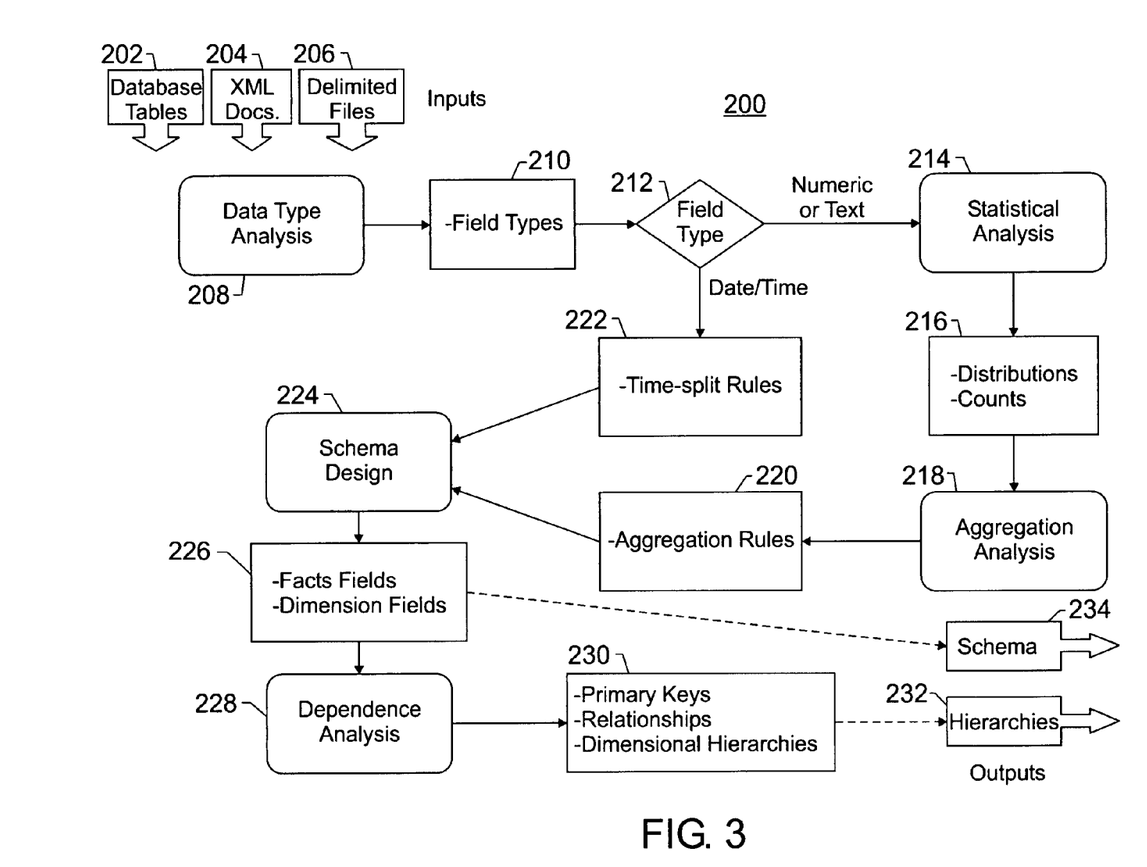
FIG. 3 is a flowchart illustrating a method of determining star schema in accordance with embodiments of the present invention.

FIG. 3 is a flowchart illustrating a method of determining a star schema in accordance with embodiments of the present invention. The flow chart may be generally referenced by the reference numeral 200. This flowchart 200 may comprise a more detailed view of the method illustrated in FIG. 1. Blocks 202, 204, and 206 may represent potential inputs as previously illustrated in FIG. 2 by blocks 102, 104, and 106. Block 208 may represent performing a data type analysis. Block 210 may represent categorized data fields resulting from the analysis in block 208. Block 212 is a decision block that may represent determining whether each field type generated in block 208 is numeric, text, or date/time. If the data type is numeric or text, a statistical analysis may be performed in block 214 and distributions and counts may be output (block 216) to determine (block 218) which data fields (block 220) are suitable for aggregation (i.e., aggregation rules). Alternatively, if the data type is date/time, time-split rules (e.g., sub-field lists) may be determined (block 222) based on available granularity levels. Any resulting time-split rules (block 222) and/or aggregation rules (block 220) may then be utilized in block 224 to create an initial schema design (block 226) in accordance with embodiments of the present invention. In some embodiments of the present invention, block 228 may separate facts table fields and dimension table fields (block 226), which may then be utilized in block 228 to refine the initial schema design. Block 228 may represent performing a dependence analysis resulting in identification of primary keys, relationships, and dimensional hierarchies (block 230) in accordance with embodiments of the present invention. Additionally, blocks 232 and 234 may respectively represent hierarchies and schema, which may be overall outputs of a method in accordance with embodiments of the present invention.

To further clarify embodiments of the present invention, Tables 1-6 provide an example implementation of one embodiment of the present invention. Table 1 illustrates exemplary input data in accordance with embodiments of the present invention. Specifically, Table 1 is a table of vendor sales records comprising five data fields (i.e., vendor, item, date, amount, explanation) as follows:

TABLE 1

| Vendor | Item | Date | Amount | Explanation |
| --- | --- | --- | --- | --- |
| Vendor 1 | Main board | May 15, 2003 | 245 | Need products within 2 weeks |
| Vendor 1 | Mouse | Jun. 15, 2003 | 50 | 25 left-handed and 25 right-handed |
| Vendor 2 | Screen | Jun. 17, 2003 | 15 | Please deliver on a business day |
| Vendor 1 | Screen | Jul. 2, 2003 | 125 | Do not deliver on Sunday |
| Vendor 2 | Mouse | Jul. 2, 2003 | 250 | All right-handed |
| Vendor 1 | Screen | Jul. 4, 2003 | 100 | Need 3-day rush delivery |

In some embodiments of the present invention, the input data illustrated by Table 1 and other such input may be aggregated according to various aggregation rules. Table 2 illustrates exemplary aggregation rules that are based on the Table 1 data fields as follows:

TABLE 2

| Field Name | Data Type | Aggregation Rule |
|---|---|---|
| Vendor | Enumeration | Calculate count |
| Item | Enumeration | Calculate count |
| Date | Date/Time | Split into year, month, day of month, . . . |
| Amount | Numeric | Calculate sum, count, min, max, avg |
| Explanation | String | Do not aggregate |

Enumeration type data fields may be aggregated by counting the number of unique data values residing in such data fields. For example, the enumeration type data fields in Table 1 may be aggregated as shown in Tables 3 and 4 as follows:

TABLE 3

| Vendor | Count |
|---|---|
| Vendor 1 | 4 |
| Vendor 2 | 2 |

TABLE 4

| Item | Count |
|---|---|
| Main board | 1 |
| Mouse | 2 |
| Screen | 3 |

Numeric data field values may be aggregated using various functions as mentioned previously (e.g., count, average, minimum, maximum, and so forth). The numeric type data field (i.e., amount) in Table 1 may be aggregated using the enumeration fields as dimensions as illustrated in Table 5 as follows:

TABLE 5

| Vendor | Item | Amount Count | Amount Sum | Amount Avg | Amount Min | Amount Max |
|---|---|---|---|---|---|---|
| Vendor 1 | Main board | 1 | 245 | 245 | 245 | 245 |
| Vendor 1 | Mouse | 1 | 50 | 50 | 50 | 50 |
| Vendor 1 | Screen | 2 | 225 | 112.5 | 100 | 125 |
| Vendor 2 | Mouse | 1 | 250 | 250 | 250 | 250 |
| Vendor 2 | Screen | 1 | 15 | 15 | 15 | 15 |

Date/time type data field values may be automatically split into sub-fields. For example, the date/time data type field in Table 1 (i.e., date) may be split into year, month, day of month, day of week, day of year, hour of day, minute, and second sub-fields as illustrated in Table 6 as follows:

TABLE 6

| Date | Year | Month | Day of Month | Day of Week | Day of Year |
|---|---|---|---|---|---|
| May 15, 2003 | 2003 | 5 | 15 | Thursday | 115 |
| . . . | . . . | . . . | . . . | . . . | . . . |

It should be noted that the date/time typed data fields may be turned into multiple enumeration type fields when split into date sub-fields in accordance with embodiments of the present invention. Accordingly, the data field types may be reduced into the following three data field types: enumeration, numeric, and text. The text type data fields may be defined as data fields that cannot be enumerated into a reasonable number of categories. Because these text type data fields cannot be enumerated, such data fields may not be aggregated. Therefore, in some embodiments of the present invention, remaining data fields will necessarily be either enumeration or numeric type data values after date/time type fields are split into date sub-fields.

Figure 4:
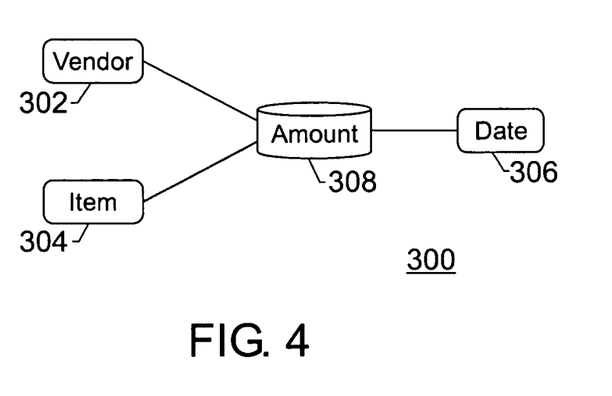
FIG. 4 is a diagram illustrating a generated star schema in accordance with embodiments of the present invention.

FIG. 4 is a diagram illustrating a generated star schema in accordance with embodiments of the present invention. The diagram may be generally referenced by the reference numeral 300. The numeric type field values may be aggregated using all possible combinations of enumeration type data field values. The aggregated data values may then be stored and retrieved using a star schema. For example, the data in Table 1 may be stored using the star schema illustrated in FIG. 4. In the star schema of FIG. 4, vendor, item, and date are the dimensions (illustrated by blocks 302, 304, and 306 respectively), and amount (illustrated by block 308) is the facts table.

As discussed previously, dimension tables in a star schema may define the dimensions (i.e., unique enumerations for which the facts table will be aggregated) and facts tables relate to numeric and additive values. However, in the input data of the present example illustrated by Table 1, there exists one numeric type data field (i.e., amount). Accordingly, the example illustrates aggregation of only one numeric type data field. It should be noted, however, that the same method may be applied to multiple numeric type data fields in order to aggregate their data values properly.

Table 7 illustrates tables and associated data fields in a star schema in accordance with embodiments of the present invention. Specifically, Table 7 represents the star schema generated in the example illustrated by Tables 1-6 and FIG. 4. The primary key of the facts table in this example is the group of foreign keys from all dimension tables (i.e., vendor, item, and dateID). It should be noted that the dateID field is an example of a new primary key generated for the date table. Additionally, the facts table contains a single data field, in the present example, that holds the numeric measurement (i.e., amount) that may be aggregated by each dimension. Again, while the facts table may contain more than one measurement data field, the example provided here has been simplified in order to explain embodiments of the present invention.

TABLE 6

| Table | Data Field |
|---|---|
| Facts | Amount, Vendor, Item, DateID |
| Vendor | Vendor |
| Item | Item |
| Date | DateID, Year, Mount, Day Of Year, Day Of Month, Day Of Week |

Figure 5:
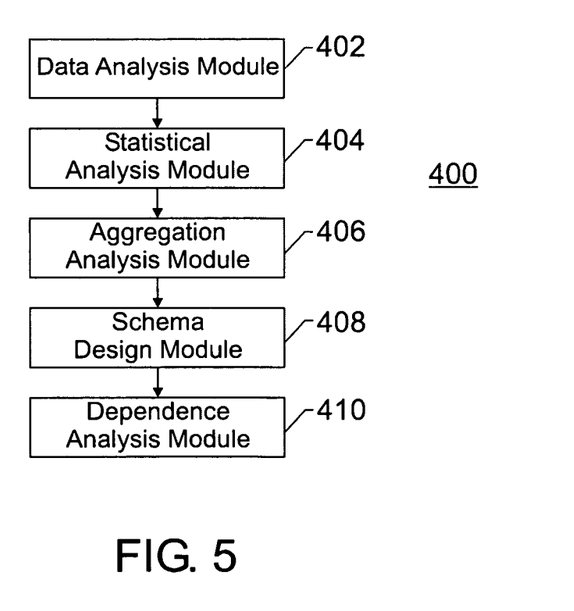
FIG. 5 is a block diagram illustrating a system and method for automatically generating a star schema from any given data by determining suitable data fields for aggregation and by determining how to aggregate those data fields in accordance with embodiments of the present invention.

FIG. 5 is a block diagram illustrating a system and method for automatically generating a star schema from any given data by determining suitable data fields for aggregation and by determining how to aggregate those data fields in accordance with embodiments of the present invention. The system and method are generally referred to by reference number 400. While FIG. 5 separately delineates specific modules, in other embodiments, individual modules may be split into multiple modules or combined into a single module. Additionally, in some embodiments of the present invention, the modules in the illustrated system and method 400 do not operate in the illustrated order. Further, those of ordinary skill in the art will recognize that individual modules and components may comprise hardware, software or some combination thereof.

FIG. 5 comprises five representative blocks including blocks 402, 404, 406, 408, and 410. Block 402 is a data analysis module for analyzing the type and distribution of values in each data field of a data source and categorizing them into numeric, text, or date/time type data fields. Block 404 is a statistical analysis module for counting a number of unique data values and occurrences of such values in numeric and text type data fields, and/or assigning sub-fields to date/time type data fields. Block 406 is an aggregation analysis module for performing an aggregation analysis to produce aggregation rules. Block 408 is a schema design module for creating an initial schema design, including separating facts and dimension table fields. Block 410 is a dependence analysis module for refining the initial schema design comprising the use of functional dependencies.

Figure 6:
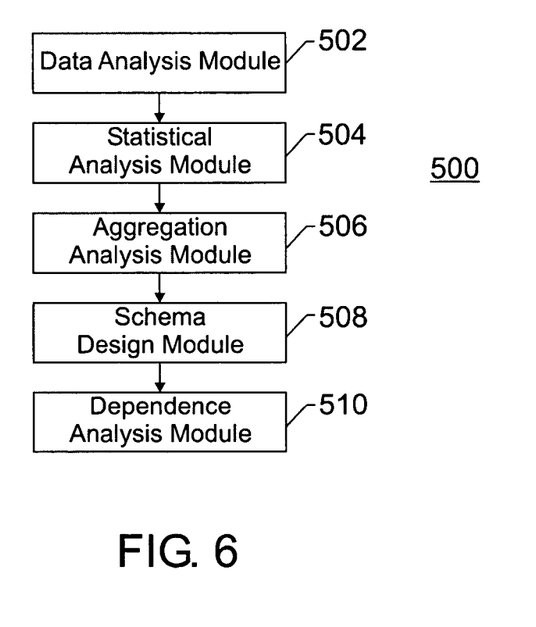
FIG. 6 is a diagram of an apparatus for automatically generating a star schema from any given data by determining suitable data fields for aggregation and by determining how to aggregate those data fields in accordance with embodiments of the present invention.

FIG. 6 is a diagram of an apparatus adapted to automatically generate a star schema from any given data by determining suitable data fields for aggregation and by determining how to aggregate those data fields in accordance with embodiments of the present invention. FIG. 6 comprises five representative blocks including blocks 502, 504, 506, 508, and 510. Each block represents a module. However, while certain modules have been delineated in the illustrated embodiment, one of ordinary skill in the art will recognize that an apparatus in accordance with the present invention may comprise modules representing a combination of the illustrated modules or modules representing a division of the illustrated modules.

Block 502 is a data analysis module for analyzing the type and distribution of values in each data field of a data source and categorizing them into numeric, text, or date/time type data fields. Block 504 is a statistical analysis module for counting a number of unique data values and occurrences of such values in numeric and text type data fields, and/or assigning sub-fields to date/time type data fields. Block 506 is an aggregation analysis module for performing an aggregation analysis to produce aggregation rules. Block 508 is a schema design module for creating an initial schema design, including separating facts and dimension table fields. Block 510 is a dependence analysis module for refining the initial schema design comprising the use of functional dependencies.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method, comprising:
    categorizing a data field into one of a plurality of data field types, one of the data field types being an enumeration type data field;
    developing dimensions for a table that represents an initial star schema design using the categorization of the data field;
    detecting functional dependencies between the data field and other data fields; and
    refining the initial star schema design by modifying the table based on detected functional dependencies.

2. The method of claim 1, comprising performing statistical analysis on the data field to generate statistics indicative of a property of the data field.

3. The method of claim 2, comprising performing an aggregation analysis using the statistics to determine whether the data field is suitable for aggregation.

4. The method of claim 1, comprising categorizing the data field into one of numeric, text, and date or time data field types.

5. The method of claim 4, comprising reassigning the data field if the data field can be classified as enumeration type.

6. The method of claim 4, comprising counting a number of unique data values in the data field when the data field is categorized as one of numeric and text.

7. The method of claim 4, comprising analyzing granularity levels of the data field when the data field is categorized as date/time.

8. The method of claim 7, comprising determining available granularity levels in the data field and assigning a set of sub-fields to the data field, wherein the sub-fields relate to the available granularity levels.

9. The method of claim 4, comprising reassigning the data field from one of numeric and text to enumeration when the data field is capable of categorization into a number of classes corresponding to a user-defined or algorithmically-defined threshold.

10. The method of claim 1, comprising assigning at least one of a sum, count, minimum, maximum, and average function as a first aggregation rule for the data field.

11. The method of claim 4, comprising extracting features from the data field to enable proper categorization when categorized as text.

12. The method of claim 11, comprising counting a number of occurrences of individual terms in the data field, selecting a term from the individual terms based on an amount of occurrences of the term, and defining the term as a first feature.

13. The method of claim 1, comprising counting a number of unique data values in the data field and a total number of data items in the data field, and categorizing the data field as enumeration based on a difference between the number of unique data values and the total number of data items.

14. The method of claim 13, comprising determining whether an amount of the data items are equivalent and categorizing the data field as enumeration based on a comparison of the amount of the data items and a defined amount.

15. The method of claim 1, comprising assigning the data field to a dimension table when the data field can be categorized as enumeration.

16. The method of claim 5, comprising assigning the data field to a facts table when the data field is categorized as numeric.

17. The method of claim 1, comprising one of identifying a primary key using an identified functional dependency and adding a new data field when there is no existing primary key.

18. A system, comprising:
    a categorizing hardware module adapted to categorize a data field into one of a plurality of data field types, one of the data field types being an enumeration type data field;
    a star schema hardware module adapted to develop dimensions for a table that represents an initial star schema design using the categorization of the data field;
    a dependency hardware module adapted to detect functional dependencies between the data field and other data fields; and
    a refinement hardware module adapted to refine the initial star schema design by modifying the table based on detected functional dependencies.

19. The system of claim 18, comprising a statistics hardware module adapted to perform statistical analysis on a data field to generate statistics indicative of a property of the data field.

20. The system of claim 19, comprising an analysis hardware module adapted to perform an aggregation analysis using the statistics to determine whether the data field is suitable for aggregation.

21. The system of claim 18, comprising a reassignment hardware module adapted to reassign the data field if the data field can be classified as enumeration type.

22. A non-transitory computer readable medium, comprising:
 a categorizing module stored on the non-transitory computer readable medium, the categorizing module adapted to categorize a data field into one of a plurality of data field types, one of the data field types being an enumeration type data field;
 a star schema module stored on the non-transitory computer readable medium, the star schema module adapted to develop dimensions for a table that represents an initial star schema design using the categorization of the data field;
 a dependency module stored on the non-transitory computer readable medium, the dependency module adapted to detect functional dependencies between the data field and other data fields; and
 a refinement module stored on the non-transitory computer readable medium, the refinement module adapted to refine the initial star schema design by modifying the table based on detected functional dependencies.

23. The non-transitory computer readable medium of claim 22, comprising a statistics module stored on the non-transitory computer readable medium, the statistics module adapted to perform statistical analysis on a data field to generate statistics indicative of a property of the data field.

24. The non-transitory computer readable medium of claim 23, comprising an analysis module stored on the non-transitory computer readable medium, the analysis module adapted to perform an aggregation analysis using the statistics to determine whether the data field is suitable for aggregation.

25. The non-transitory computer readable medium of claim 22, comprising a reassignment module stored on the non-transitory computer readable medium, the reassignment module adapted to reassign the data field if the data field can be classified as enumeration type.

\* \* \* \* \*